US012519281B2

(12) United States Patent
Kane et al.

(10) Patent No.: US 12,519,281 B2
(45) Date of Patent: Jan. 6, 2026

(54) LASER ASSEMBLY WITH ACTIVE POINTING COMPENSATION DURING WAVELENGTH TUNING

(71) Applicant: DAYLIGHT SOLUTIONS, INC., San Diego, CA (US)

(72) Inventors: Justin Kane, San Diego, CA (US); Mark Bermal, San Diego, CA (US); Jeremy Rowlette, Escondido, CA (US); David Francis Arnone, Mountain View, CA (US); Edeline Fotheringham, San Diego, CA (US); Ronald Arp, Ramona, CA (US)

(73) Assignee: Daylight Solutions, Inc., San Diego, CA (US)

( * ) Notice: Subject to any disclaimer, the term of this patent is extended or adjusted under 35 U.S.C. 154(b) by 790 days.

(21) Appl. No.: 17/791,818

(22) PCT Filed: Jan. 27, 2021

(86) PCT No.: PCT/US2021/015229
§ 371 (c)(1),
(2) Date: Jul. 8, 2022

(87) PCT Pub. No.: WO2021/154820
PCT Pub. Date: Aug. 5, 2021

(65) Prior Publication Data
US 2023/0049459 A1 Feb. 16, 2023

Related U.S. Application Data

(60) Provisional application No. 62/966,653, filed on Jan. 28, 2020.

(51) Int. Cl.
*H01S 3/10* (2006.01)
*H01S 5/00* (2006.01)
(Continued)

(52) U.S. Cl.
CPC .......... *H01S 5/0071* (2013.01); *H01S 5/0085* (2013.01); *H01S 5/02255* (2021.01);
(Continued)

(58) Field of Classification Search
CPC .. H01S 5/0071; H01S 5/0085; H01S 5/02255; H01S 5/141; H01S 5/40;
(Continued)

(56) References Cited

U.S. PATENT DOCUMENTS 6,665,320 B1 * 12/2003 Arbore .................. H01S 5/4062
372/6
9,086,375 B2 7/2015 Priest et al.
(Continued)

OTHER PUBLICATIONS

Official Communication pursuant to Article 94(3) EPC from the European Patent Office, dated Aug. 11, 2023, for EPO Application Serial No. 21705843.7.
(Continued)

*Primary Examiner* — Kinam Park
(74) *Attorney, Agent, or Firm* — ROEDER & BRODER LLP; Steven G. Roeder

(57) ABSTRACT

An assembly (10) for generating a laser beam (12) includes a beam steering assembly (18); a laser assembly (16) that is tunable over a tunable range; and a controller (20). The laser assembly (16) generates a laser beam (12) that is directed at the beam steering assembly (18). The controller (20) dynamically controls the beam steering assembly (18) to dynamically steer the laser beam (12) as the laser assembly (16) is tuned over at least a portion of the tunable range. As a result thereof, the laser beam (12) is actively steered along a desired beam path (12A) while the wavelength of the laser beam (12) is varied.

21 Claims, 10 Drawing Sheets

(51) Int. Cl.
*H01S 5/02255* (2021.01)
*H01S 5/14* (2006.01)
*H01S 5/40* (2006.01)
*G01N 21/39* (2006.01)
*H01S 3/1055* (2006.01)
*H01S 5/02325* (2021.01)

(52) U.S. Cl.
CPC ............... H01S 5/141 (2013.01); H01S 5/40 (2013.01); H01S 5/4012 (2013.01); *G01N 21/39* (2013.01); *H01S 3/1055* (2013.01); *H01S 5/02325* (2021.01); *H01S 5/4031* (2013.01); *H01S 5/4087* (2013.01)

(58) Field of Classification Search
CPC .. H01S 5/4012; H01S 3/1055; H01S 5/02325; H01S 5/4031; H01S 5/4087
See application file for complete search history.

(56) References Cited

U.S. PATENT DOCUMENTS

| | | | |
|---|---|---|---|
| 2002/0064192 A1* | 5/2002 | Missey | H01S 5/12 372/20 |
| 2002/0154666 A1 | 10/2002 | Vail et al. | |
| 2003/0039275 A1* | 2/2003 | Pezeshki | G02B 26/0841 372/20 |
| 2006/0013270 A1* | 1/2006 | Yumoto | G02F 1/3775 372/21 |
| 2008/0031293 A1 | 2/2008 | Takamizawa et al. | |
| 2015/0070756 A1* | 3/2015 | Priest | H01S 5/4012 359/385 |
| 2015/0323384 A1* | 11/2015 | Bird | G01J 3/10 250/339.06 |
| 2016/0028207 A1* | 1/2016 | Cable | H01S 5/0071 372/20 |
| 2016/0169747 A1* | 6/2016 | Weida | G01J 5/084 250/341.1 |
| 2018/0331500 A1* | 11/2018 | Cheung | H01S 5/4068 |
| 2019/0013640 A1* | 1/2019 | Cheung | H01S 5/4062 |

OTHER PUBLICATIONS

International Search Report and Written Opinion issued in PCT Application No. PCT/US2021/015229, dated May 10, 2021 by the European Patent Office.

* cited by examiner

LASER ASSEMBLY WITH ACTIVE POINTING COMPENSATION DURING WAVELENGTH TUNING

RELATED APPLICATION

This application claims priority on U.S. Provisional Application No. 62/966,653 filed on Jan. 28, 2020, and entitled "LASER ASSEMBLY WITH ACTIVE POINTING COMPENSATION DURING WAVELENGTH TUNING". As far as permitted, the contents of U.S. Provisional Application No. 62/966,653 are incorporated herein by reference.

As far as permitted, the contents of U.S. Pat. No. 9,086,375, issued on Jul. 21, 2015 are incorporated herein by reference.

BACKGROUND

Semiconductor devices such as quantum cascade devices, interband cascade devices, and light-emitting diodes can be turned into tunable lasers through a variety of means. For example, a tunable wavelength selective element can be spaced apart from the semiconductor device to form a tunable, external cavity laser. In this design, the wavelength selective element is selectively tuned to adjust the center optical wavelength of a laser beam generated by the tunable laser.

The external cavity lasers can be used in spectroscopy applications where it is desired to provide a laser beam having a center optical wavelength ("wavelength") that is varied over time over a tunable range, while recording a response of some sample as a function of the changing optical wavelength of the laser beam. In such applications, it is also often desired to rapidly tune the laser wavelength in a single sweep across the tunable range. This minimizes variations in the sample during data acquisition.

More specifically, external cavity lasers that generate light in the mid infrared ("MIR") range are useful for absorption spectroscopy applications since many samples have their fundamental vibrational modes in the MIR range, and thus present strong, unique absorption signatures within the MIR range.

Unfortunately, existing tunable lasers assemblies are not capable of generating an accurate laser beam over a broad spectral range.

SUMMARY

The present invention is directed an assembly for generating a laser beam. In one embodiment, the assembly includes: a beam steering assembly; a laser assembly that is tunable over a tunable range, the laser assembly generating a laser beam that is directed at the beam steering assembly; and a controller that dynamically controls the beam steering assembly to dynamically steer the laser beam as the laser assembly is tuned over at least a portion of the tunable range. With this design, the beam steering assembly provides active beam pointing compensation, and the assembly generates an accurately steered laser beam that is tuned to span a predetermined output wavelength range.

Without active pointing compensation, a beam path of the laser beam will vary during tuning. For example, if it is desired to direct the laser beam at a target area on an object, without active pointing compensation, the beam path will vary, and the intensity of the laser beam on the target area will change as the assembly is tuned. In contrast, in one implementation of the assembly provided herein, the laser beam can be actively steered as the laser assembly is tuned to maintain the desired beam path of the laser beam.

In one implementation, the controller dynamically controls the beam steering assembly so that the laser beam is directed along a desired beam path while the laser assembly is tuned over at least a portion of the tunable range. In alternative non-exclusive embodiments, the controller dynamically controls the beam steering assembly so that the laser beam is directed along the desired beam path while the laser assembly is tuned over at least 50, 100, 250, 500, or 1000 cm$^{-1}$ wavelengths.

In alternative, non-exclusive examples, the size of the tunable (wavelength) range can be at least approximately 50, 100, 200, 300, 400, 500, 1000, 2000, 3000, 4000, 4500, or 5000 cm-1 wavelengths. However, the size of the tunable range can larger or smaller than these amounts.

In one embodiment, the desired beam path is constant along a desired axis. Alternatively, the desired beam path can be varied over time or relative to wavelength.

As provided herein, the controller can dynamically control the beam steering assembly so that the laser beam is directed at a substantially constant target area while the laser assembly is tuned over at least a portion of the tunable range. As used herein, the term "substantially constant target area" shall mean less than fifty µRadian deviation in pointing angle.

In certain alternative embodiments, the controller dynamically controls the beam steering assembly so that the laser beam is directed at the substantially constant target area while the laser assembly is tuned over at least sixty, seventy, eighty, ninety, or one hundred percent of the tunable range.

The controller can dynamically control the beam steering assembly so that the laser beam is directed within fifty µRadian micrometers of the target area while the laser assembly is tuned over at least a portion of the tunable range. In alternative, non-exclusive embodiments, the controller can dynamically control the beam steering assembly so that a compensation target error is less than five, ten, fifteen, twenty, or fifty microradians over the entire spectral sweep.

The beam steering assembly can include a first beam steerer and a spaced apart second beam steerer. At least one of the beam steerers can be selectively controlled to dynamically steer the laser beam as the laser assembly is tuned over the tunable range.

At least one of the beam steerers can include a reflector that is selective moved about a rotational axis to dynamically steer the laser beam as the laser assembly is tuned over at least a portion of the tunable range.

For example, the first beam steerer can include a first reflector that is selective moved about a first rotational axis and the second beam steerer can include a second reflector that is selectively moved about a second rotation axis to dynamically steer the laser beam as the laser assembly is tuned over at least a portion of the tunable range.

The controller can dynamically position the beam steerers as a function of wavelength so that the laser beam follows a desired beam path.

Further, the controller can dynamically control the beam steering assembly to dynamically steer the laser beam so that an optical power of the laser beam on a target area is optimized.

The laser assembly can include (i) a first laser module that generates a first beam when power is directed to the first laser module; and (ii) a second laser module that generates a second beam when power is directed to the second laser module. Further, the controller can dynamically control the beam steering assembly to alternatively direct the first beam and the second beam along an output axis.

In another implementation, the present invention is directed to a method for generating a laser beam comprising: providing a beam steering assembly; generating a laser beam that is directed at the beam steering assembly with a laser assembly that is tunable over a tunable range; and dynamically controlling the beam steering assembly with a controller to dynamically steer the laser beam as the laser assembly is tuned over at least a portion of the tunable range.

The method can include controlling the beam steering assembly so that the laser beam is directed along a desired beam path while the laser assembly is tuned over at least a portion of the tunable range.

Additionally or alternatively, the method can include controlling the beam steering assembly so that the laser beam is directed at a substantially constant target area while the laser assembly is tuned over at least a portion of the tunable range.

Additionally or alternatively, the method can include dynamically controlling the beam steering assembly to dynamically steer the laser beam so that an optical power of the laser beam on a target area is optimized.

In another implementation, the present invention is directed at an assembly for generating a laser beam. In this implementation, the assembly includes: a beam steering assembly; a laser assembly that is tunable over a tunable range, the laser assembly generating a laser beam that is directed at the beam steering assembly; and a controller that dynamically controls the beam steering assembly to dynamically steer the laser beam as the laser assembly is tuned over at least a portion of the tunable range. Additionally, this implementation can include one or more of the following features: (i) the controller dynamically controlling the beam steering assembly so that the laser beam is directed along a desired beam path while the laser assembly is tuned over at least a portion of the tunable range; (ii) the controller dynamically controlling the beam steering assembly so that the laser beam is directed at a substantially constant target area while the laser assembly is tuned over at least a portion of the tunable range; (iii) the controller dynamically controlling the beam steering assembly so that the laser beam is directed at the substantially constant target area while the laser assembly is tuned over at least sixty, seventy, eighty, ninety, or one hundred percent of the tunable range; (iv) the beam steering assembly having a first beam steerer and a spaced apart second beam steerer, with at least one of the beam steerers being selectively controlled to dynamically steer the laser beam as the laser assembly is tuned over the tunable range; (v) the controller dynamically positions the beam steerers as a function of wavelength so that the laser beam follows a desired beam path; and/or (vi) the controller dynamically controls the beam steering assembly to dynamically steer the laser beam so that an optical power of the laser beam on a target area is optimized.

With this design, the beam steering assembly can be dynamically adjusted so that the laser beam follows the desired beam path as the laser assembly is tuned over the tunable range, and/or the beam steering assembly can be dynamically adjusted so that the laser beam is pointed at a substantially constant position as the laser assembly is tuned over the tunable range.

DESCRIPTION

Figure 1:
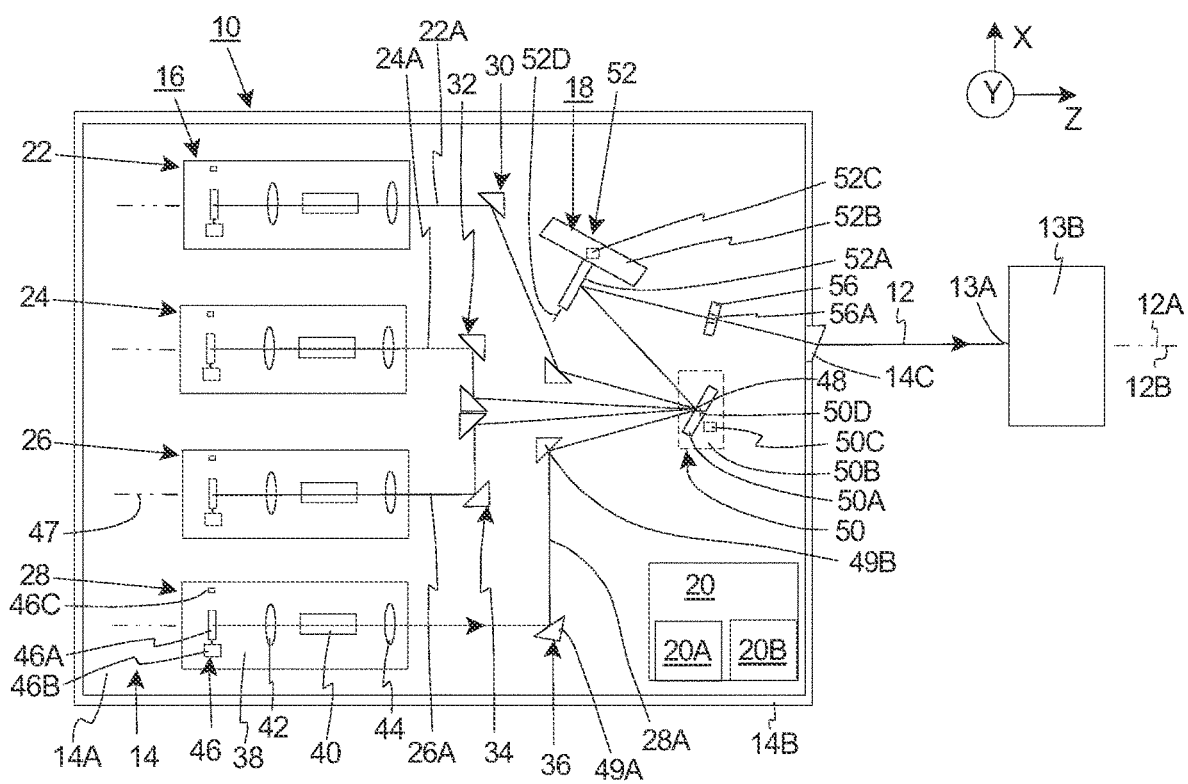
FIG. 1 is a simplified top schematic illustration of an object and an assembly having features of the present invention.

FIG. 1 is a simplified top view of an assembly 10 that generates an output laser beam 12 having active pointing compensation and/or control. With this design, the assembly 10 rapidly generates an accurately steered laser beam 12 that is tuned to span a predetermined output wavelength range ("tunable range").

As provided above, without active pointing compensation, a beam path 12A of the laser beam 12 will vary during tuning. For example, if it is desired to direct the laser beam 12 at a target area 13A on an object 13B (illustrated as a box), without active pointing compensation, the beam path 12A will vary, and the intensity of the laser beam 12 on the target area 13A will change as the assembly 10 is tuned. In contrast, in one implementation of the assembly 10 provided herein, the laser beam 12 can be actively steered as the laser assembly 16 is tuned to maintain the desired beam path 12A of the laser beam 12 (e.g. along a desired beam axis 12B).

Some of the Figures include an orientation system that illustrates an X axis, a Y axis that is orthogonal to the X axis, and a Z axis that is orthogonal to the X and Y axes. It should be noted that these axes can also be referred to as the first, second and third axes and or the axes can be changed.

As non-exclusive examples, the assembly 10 can provide a laser beam 12 for imaging, locating, detecting, and/or identifying a substance, e.g. a gas (not shown) or a trace element, analyzing a sample, and/or other industrial or testing applications. The assembly 10 is well suited for applications that require accurate and rapid broad spectral sweeps.

The desired predetermined output wavelength range can be varied to suit the desired application for the assembly 10. For example, in many applications, a relatively large wavelength range is necessary to achieve specificity when analyzing mixtures of chemicals. Further, the resolution between different spectral signatures for different chemicals increases as the spectral range that is being analyzed is increased, thus allowing individual components to be detected.

In one embodiment, the assembly 10 is designed to generate a laser beam 12 that consists of a set of sequential, specific output pulses of light having a center wavelength that is varied over time to span the entire or just a portion of the mid-infrared range of approximately two to twenty (2-20) micrometers. With this design, the assembly 10 is particularly useful in absorption spectroscopy applications since many gases of interest have strong, unique absorption signatures within the mid-infrared range. Alternatively, the assembly 10 can be designed to generate one or more pulses of light having a center wavelength of greater than or lesser than two to twenty micrometers. For example, in another embodiment, the tunable range is only a portion of the MIR range. As alternative, non-exclusive examples, the tunable range can be the wavelength range of approximately 2-10 micrometers; 10-20 micrometers; 5-15 micrometers; 5-10 micrometers; 10-15 micrometers; or 15-20 micrometers. Stated in another fashion, the tunable range can be at least five, six, seven, eight, nine, ten, twelve, fifteen or eighteen micrometers. In additional, alternative non-exclusive examples, the tunable range can be the wavelength range of approximately 500-5000 cm-1; 500-1000 cm-1; 1000-1500 cm-1; 1500-2000 cm-1; 2000-2500 cm-1; 2500-3000 cm-1; 3000-3500 cm-1; 3500-4000 cm-1; 4000-4500 cm-1; or 4500-5000 cm-1.

In one embodiment, the assembly 10 includes (i) a frame 14, (ii) a laser assembly 16 that is tunable over the tunable range, (iii) a beam steering assembly 18, and (iv) a controller 20 that dynamically controls the beam steering assembly 18 to dynamically steer the laser beam 12 and provide active pointing compensation as the tunable laser assembly 16 is tuned over at least a portion of the tunable range. The design of each of these components can be varied pursuant to the teachings provided herein. Further, it should be noted that the assembly 10 can be designed with more or fewer components than described herein.

The frame 14 supports at least some of the components of the assembly 10. In FIG. 1, the laser assembly 16, the beam steering assembly 18, and the controller 20 are each fixedly secured to the frame 14; and the frame 14 maintains these components in precise mechanical alignment. Alternatively, for example, the controller 20 can be separate from and external to the frame 14.

In one embodiment, the frame 14 can include a rigid frame base 14A; four side walls 14B, and a top cover (not shown) secured to the top of the side walls 14B to create a chamber (not shown). In certain embodiments, the chamber can be sealed to provide a controlled environment for the sensitive components of the assembly 10. For example, the chamber can be filled with an inert gas, or another type of fluid, or subjected to vacuum.

Additionally, in certain embodiments, the frame 14 includes a window 14C that allows the laser beam 12 to exit the frame 14, and a shutter (not shown) for safety that selectively opens and closes the window 14C. In the non-exclusive embodiment illustrated in FIG. 1, the window 14C is a wedge shaped element that redirects the laser beam 12 so that the laser beam 12 is directed substantially parallel to the Z axis as it exits the frame 14. Alternatively, for example, the window 14C can be another shape. As alternative, non-exclusive examples, the wedged shaped window 14C can be at an angle of five, ten, fifteen, or twenty degrees. Alternatively, other angles can be utilized.

The laser assembly 16 is selectively tunable over the predetermined wavelength range. The laser assembly 16 can include one or more laser modules ("channels") 22, 24, 26, 28, and one or more director assemblies 30, 32, 34, 36 that cooperate to direct the laser beam 12 at the beam steering assembly 18. The number and/or design of the laser modules 22, 24, 26, 28 can be varied pursuant to the teachings provided herein to achieve the desired output wavelength range. In one, non-exclusive embodiment, the laser assembly 16 includes four, spaced apart laser modules 22, 24, 26, 28. Alternatively, the laser assembly 16 can be designed to include more than four, or fewer than four laser modules 22, 24, 26, 28. In one, non-exclusive embodiment, each of the laser modules 22, 24, 26, 28 is somewhat similar in design, except for its spectral output. For example, each of the laser modules 22, 24, 26, 28 can be specifically designed to generate a different portion (or partly overlapping portion) of the predetermined wavelength range. Thus, the number of laser modules 22, 24, 26, 28 can be increased to increase the predetermined wavelength range, with each laser module 22, 24, 26, 28 generating a separate portion of the predetermined wavelength range.

As provided herein, in one embodiment, power is sequentially directed to (i) the first laser module 22 ("first channel") to generate a first beam 22A that consists of a plurality of sequential first pulses of light that span a first range portion; (ii) the second laser module 24 ("second channel") to generate a second beam 24A that consists of a plurality of sequential second pulses of light that span a second range portion; (iii) the third laser module 26 ("third channel") to generate a third beam 26A that consists of a plurality of sequential third pulses of light that span a third range portion; and (iv) the fourth laser module 28 ("fourth channel") to generate a fourth beam 28A that consists of a plurality of sequential fourth pulses of light that span a fourth range portion. With this design, the first beam 22A, the second beam 24A, the third beam 26A, and the fourth beam 28A can be sequentially used to provide the pulses of light that cover the entire predetermined wavelength range. It should be noted that the order of firing of the laser modules 22, 24, 26, 28 can be any arrangement.

As a specific, non-exclusive example, (i) the first range portion can be approximately 6.5 to 7.5 micrometers; (ii) the second range portion can be approximately 7.5 to 8.5 micrometers; (iii) the third range portion can be approximately 8.5 to 9.5 micrometers; and (iv) the fourth range portion can be approximately 9.5 to 10.5 micrometers. In this example, each beam 22A, 24A, 26A, 28A has a center wavelength in the MIR range.

In one embodiment, each laser module 22, 24, 26, 28 is an extended cavity, mid infrared laser. It should be noted that one or more of the other laser modules 22, 24, 26, 28 can be similar in design. In the embodiment illustrated in FIG. 1, each of the laser modules 22, 24, 26, 28 is similar in design. Moreover, in FIG. 1, each laser module 16 includes a module frame 38, a gain medium 40, a cavity optical assembly 42, an output optical assembly 44, and a wavelength selective ("WS") feedback assembly 46. The design of each of these components can be varied.

The module frame 38 provides a rigid support for the components that are part of the laser module 16. In certain embodiments, the module frame 38 is made of a rigid material having a relatively high thermal conductivity to readily transfer heat away from the gain medium 40.

The gain medium 40 for each laser module 22, 24, 26, 28 can directly emit the respective beams 22A, 24A, 26, 28A without any frequency conversion in the mid infrared range. As non-exclusive examples, the gain medium 40 for one or more of the laser modules 22, 24, 26, 28 can be a Quantum Cascade (QC) gain medium, an Interband Cascade (IC) gain medium, or a mid-infrared diode.

As provided herein, the fabrication of each gain medium 40 can be altered to achieve the desired output frequency range for each gain medium 40. For example, the gain medium 40 of the first laser module 22 can be fabricated to have a tuning range that matches the desired first range portion; the gain medium 40 of the second laser module 24 can be fabricated to have a tuning range that matches the desired second range portion; the gain medium 40 of the third laser module 26 can be fabricated to have a tuning range that matches the desired third range portion; and the gain medium 40 of the fourth laser module 28 can be fabricated to have a tuning range that matches the desired fourth range portion. As a non-exclusive example, the thickness of the wells/barriers of a Quantum Cascade gain medium determine the wavelength characteristic of the respective Quantum Cascade gain medium. Thus, fabricating a Quantum Cascade gain medium of different thickness enables production of the laser having different output frequencies within the MIR range.

In this embodiment, each gain medium 40 includes (i) a first facet that faces the respective cavity optical assembly 42 and the wavelength selective element 46, and (ii) a second facet that faces the output optical assembly 44, and each gain medium 40 emits from both facets. In one embodiment, each first facet is coated with an anti-reflection ("AR") coating, and each second facet is coated with a reflective coating. With this design, for each laser module 22, 24, 26, 28, the reflective second facet of the gain medium 40 acts as a first end (output coupler) of an external cavity, and the wavelength selective element 46 defines a second end of the each external cavity.

The cavity optical assembly 42 is positioned between the gain medium 40 and the feedback assembly 46 along a lasing axis 47 of the respective laser module 22, 24, 26, 28. The cavity optical assembly 42 collimates and focuses the beam that passes between these components. For example, each cavity optical assembly 42 can include one or more lens. For example, the lens can be an aspherical lens having an optical axis that is aligned with the respective lasing axis 47.

The output optical assembly 44 is positioned between the gain medium 40 and the respective beam director assembly 30, 32, 34, 36 in line with the lasing axis 47 to collimate and focus the respective beam 22A, 24A, 26, 28A that exits the second facet. For example, each output optical assembly 44 can include one or more lens that are somewhat similar in design to the lens of the cavity optical assemblies 42.

The wavelength selective element 46 reflects the beam back to the gain medium 40, and is used to precisely select and adjust the lasing frequency of the external cavity and the wavelength of the pulses of light. In this manner, the respective beams 22A, 24A, 26, 28A may be tuned with the wavelength selective element 46 without adjusting the respective gain medium 40. Thus, with the external cavity arrangements disclosed herein, the wavelength selective element 46 dictates what wavelength will experience the most gain in each laser module 22, 24, 26, 28.

A number of alternative embodiments of the wavelength selective element 46 can be utilized. In FIG. 1, the wavelength selective element 46 includes a grating 46A, a grating mover 46B (e.g. a voice coil actuator), and a feedback detector 46C. The grating mover 46B selectively moves (e.g. rotates about the X axis in this example) the grating 46A to rapidly adjust the lasing frequency of the gain medium 40. Further, the rotational position and/or movement of the grating 46A can be continuously monitored with the feedback detector 46C that provides for closed loop control of the grating mover 46B. As non-exclusive examples, for each laser module 22, 24, 26, 28, the grating mover 46B moves the grating 46A to adjust the angle of incidence θ over the entire adjustment range to scan the wavelength range in less than approximately 0.01, 0.1, 0.5, 1, 2, 3, 4, 5, 6, 7, 8, 9, 10, 12, 14, 16, 18, 20, or more seconds.

The feedback device 46C generates a grating feedback signal that relates to the position of the respective grating 46A and/or the angle of incidence θ of the beam on the respective grating 46A. As a non-exclusive example, the feedback device 46C can be an optical encoder that includes a plurality of encoder marks, and an optical reader. As provided herein, each laser modules 22, 24, 26, 28 has its own feedback device 46C. With this design, the wavelength of each beam 22A, 24A, 26A 28A can be selectively tuned in a closed loop fashion.

Alternatively, for example, the wavelength selective element 46 can be another type of frequency selective element. A discussion of the techniques for realizing the full laser tuning range from a semiconductor device can be found in M. J. Weida, D. Caffey, J. A. Rowlette, D. F. Arnone and T. Day, "Utilizing broad gain bandwidth in quantum cascade devices", Optical Engineering 49 (11), 111120-111121-111120-111125 (2010). As far as permitted, the contents of this article are incorporated herein by reference.

As provided herein, in certain embodiments, for each laser modules 22, 24, 26, 28 there is a corresponding director assembly 30, 32, 34, 36. More specifically, (i) a first director assembly 30 is used to precisely direct the first beam 22A from the first laser module 22 at the beam selector assembly 18; (ii) a second director assembly 32 is used to precisely direct the second beam 24A from the second laser module 24 at the beam selector assembly 18; (iii) a third director assembly 34 is used to precisely direct the third beam 26A from the third laser module 26 at the beam selector assembly 18; and (iv) a fourth director assembly 36 is used to precisely direct the fourth beam 28A from the fourth laser module 28 at the beam selector assembly 18. Stated in another fashion, the beams 22A, 24A, 26A, 28A are redirected by the director assemblies 30, 32, 34, 36 to converge on the beam steering assembly 18. The design of each director assembly 30, 32, 34, 36 can be varied pursuant to the teachings provided herein.

In certain embodiments, with the present design, the director assemblies 30, 32, 34, 36, and the beam steering assembly 18 are designed to reflect and direct the beams 22A, 24A, 26A, 28A without rotating or changing the polarization of the beams 22A, 24A, 26A, 28A. Due to the architecture of reflective beam steering optics in a common plane with the beam steering assembly 18, the assembly can have a polarization that is substantially common across the entire multi-module range.

In one embodiment, each beam 22A, 24A, 26A, 28A is incident on the beam steering assembly 18 at a different angle, at approximately the same location 48 ("zero point'). With the present design, the director assemblies 22, 24, 26, 28 can be used to correct the direction, pitch and yaw of the beams 22A, 24A, 26A, 28A. In one non-exclusive embodiment, each director assembly 30, 32, 34, 36 includes a pair of redirectors, namely a first redirector 49A and a second redirector 49B that is spaced apart from the first redirector 49A. In this embodiment, the pair of redirectors 49A, 49B reflect and redirect the respective beam 22A, 24A, 26A, 28A at the zero point 48 of the beam steering assembly 18. In one embodiment, each redirector 49A, 49B includes a mirror that redirects the respective beam 22A, 24A, 26A, 28A.

In FIG. 1, each beam 22A, 24A, 26A, 28A exits its respective laser module 22, 24, 26, 28 substantially parallel to the Z axis. Next, the first redirector 49A of each laser module 22, 24, 26, 28 redirects the respective beam 22A, 24A, 26A, 28A approximately along the X axis. Subsequently, the second redirector 49B of each laser module 22, 24, 26, 28 redirects the respective beam 22A, 24A, 26A, 28A substantially along (but not parallel to) the Z axis at the beam steering assembly 18.

In this embodiment, each redirector 49A, 49B is secured to the frame base 14A and each redirector 49A, 49B is independently adjustable so that the angle of incidence of each beam 22A, 24A, 26A, 28A on the beam steering assembly 18 can be selectively adjusted. For example, each redirector 49A, 49B can be independently adjustable about a first axis and about a second axis that is perpendicular to the first axis relative to the fame base 14A. For example, the first redirectors 49A can be adjustable about the X and Y axes, and the second redirectors 49B can be adjustable about the X and Z axes. With this design, the laser modules 22, 24, 26, 28 can be attached to the frame 14, and subsequently, the redirectors 49A, 49B can be independently adjusted to achieve the desired angle of incidence of each beam 22A, 24A, 26A, 28A on the beam steering assembly 18. Alternatively, the director assemblies 30, 32, 34, 36 can be designed so that only one of the redirectors 49A, 49B is selectively adjustable.

The beam steering assembly 18 is controlled by the controller 20 to individually select which of the beams 22A, 24A, 26A, 28A becomes the output beam 12 directed along the beam path 12A. Further, the beam steering assembly 18 is controlled by the controller 20 to actively steer the output beam 12 to actively control the desired beam path 12A as the laser assembly 16 is tuned. With this design, the beam steering assembly 18 can be actively controlled by the controller 20 to compensate for the pointing of the laser beam 12 during tuning of the laser assembly 16.

In one embodiment, the beam steering assembly 18 actively steers the output beam 12 to compensate for variations that occur during tuning of the laser assembly 16 to maintain the output beam 12 directed along the desired beam path 12A. For example, the beam steering assembly 18 can actively steer the output beam 12 to maintain the output beam 12 pointed at the target area 13A during tuning of the laser assembly 16. Alternatively, for example, the beam steering assembly 18 can actively steer the output beam 12 along a moving desired beam path 12A during tuning of the laser assembly 16. The design of the beam steering assembly 18 can be varied to achieve the design requirements of the assembly.

In FIG. 1, the beam steering assembly 18 includes a first beam steerer 50 and a second beam steerer 52 that is spaced apart from the first beam steerer 50. The design of each beam steerer 50, 52 can be varied. In FIG. 1, (i) the first beam steerer 50 includes a first reflector 50A, a first mover 50B that selectively moves (e.g. rotates) the first reflector 50A, and a first position sensor 50C (illustrated as a box) that monitors the position of the first reflector 50A; and (ii) the second beam steerer 52 includes a second reflector 52A, a second mover 52B that selectively moves (e.g. rotates) the second reflector 52A, and a second position sensor 52C (illustrated as a box) that monitors the position of the second reflector 50A. With this design, the controller 20 (i) controls the first mover 50B to precisely position the first reflector 50A using feedback from the first position sensor 50C; and (ii) controls the second mover 52B to precisely position the second reflector 52A using feedback from the second position sensor 52C.

Figure 2:
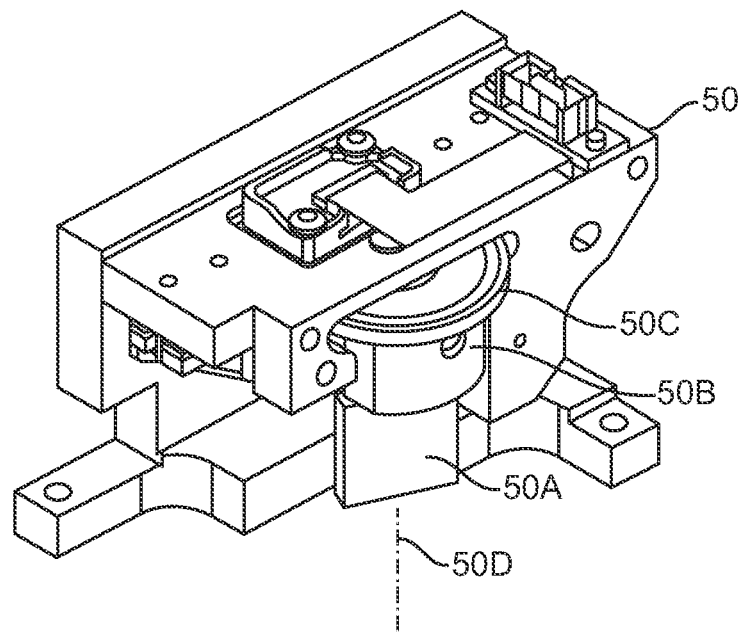
FIG. 2 is a perspective view of a first beam steerer.

FIG. 2 is a perspective view of the first beam steerer 50 including the first reflector 50A, the first mover 50B, and the first position sensor 50C. In this embodiment, (i) the first reflector 50A is a flat, rectangular shaped mirror, (ii) the first mover 50B is a voice coil motor that selectively rotates the first reflector 50A about a first rotational axis 50D, and (iii) the first position sensor 50C is an encoder or Hall type sensor that provides the rotational position of the first reflector 50A. Alternatively, each of these components can have a different design. For example, the first reflector 50A can be a multifaceted polygonal mirror.

Figure 3:
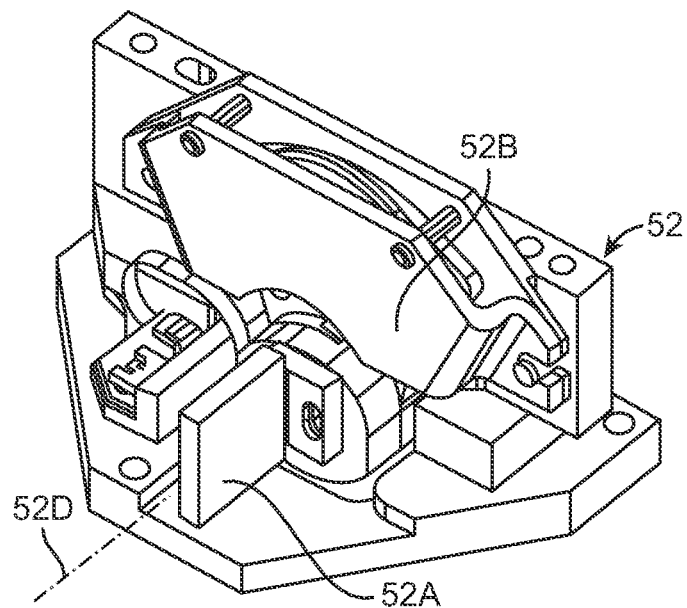
FIG. 3 is a perspective view of a second beam steerer.

Somewhat similarly, FIG. 3 is a perspective view of the second beam steerer 52 including the second reflector 52A, the second mover 52B, and the second position sensor 52C (not visible in FIG. 3). In this embodiment, (i) the second reflector 52A is a flat, rectangular shaped mirror, (ii) the second mover 52B is a voice coil motor that selectively rotates the second reflector 52A about a second rotational axis 52D, and (iii) the second position sensor 52C is an encoder or Hall type sensor that provides the rotational position of the second reflector 52A. Alternatively, each of these components can have a different design. For example, the second reflector 52A can be a multifaceted polygonal mirror.

Referring back to FIG. 1, the individual beams 22A, 24A, 26A, 28A are directed at the first beam steerer 50 at different angles, and the first beam steerer 50 is selectively positioned to select which of the beams 22A, 24A, 26A, 28A is directed at the second beam steerer 52 to become the output beam 12. With this design, the first mover 50B can selectively position the first reflector 50A at alternative rotational positions about the first rotational axis 52D (illustrated as a plus sign in FIG. 1 because the first rotational axis is orthogonal to the page) to redirect (select) one of the beams 22A, 24A, 26A, 28A at the second beam steerer 52.

Figure 4A:
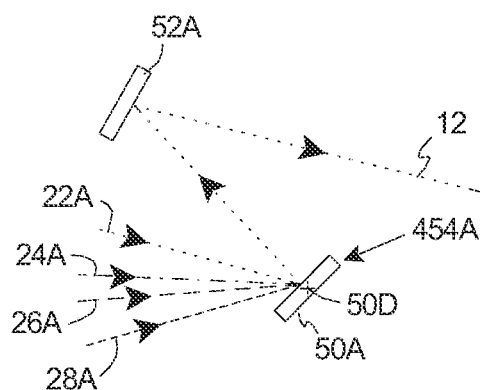
FIGS. 4A-4D are alternative, simplified top illustrations a first reflector, a second reflector, and a plurality of laser beams.

FIG. 4A is a simplified top illustration of the first reflector 50A, the second reflector 52A, the first laser beam 22A (dotted line), the second laser beam 24A (dot-dashed line), the third laser beam 26A (long dashed line), and the fourth laser beam 28A (short dashed line). In FIG. 4A, the laser beams 22A, 24A, 26A, 28A are incident on the first reflector 50A at different angles, and the first reflector 50A is in a first selector position 454A which directs (selects) the first laser beam 22A at the second reflector 52A to become the output beam 12.

Figure 4B:
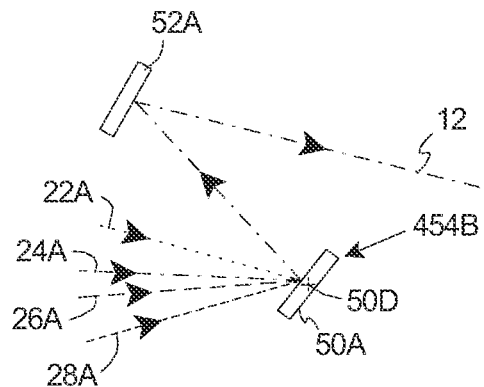

Similarly, FIG. 4B is a simplified top illustration of the first reflector 50A, the second reflector 52A, the first laser beam 22A (dotted line), the second laser beam 24A (dot-dashed line), the third laser beam 26A (long dashed line), and the fourth laser beam 28A (short dashed line). In FIG. 4B, the laser beams 22A, 24A, 26A, 28A are incident on the first reflector 50A at different angles, and the first reflector 50A is in a second selector position 454B which directs (selects) the second laser beam 24A at the second reflector 52A to become the output beam 12.

Figure 4C:
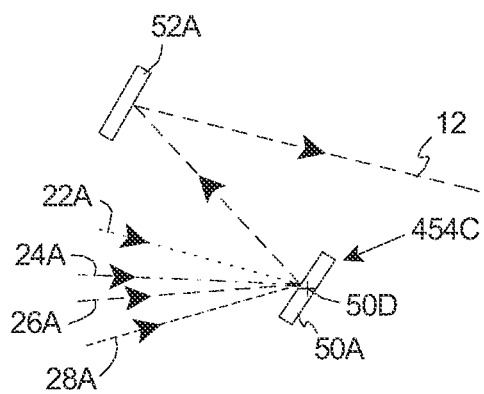

Further, FIG. 4C is a simplified top illustration of the first reflector 50A, the second reflector 52A, the first laser beam 22A (dotted line), the second laser beam 24A (dot-dashed line), the third laser beam 26A (long dashed line), and the fourth laser beam 28A (short dashed line). In FIG. 4C, the laser beams 22A, 24A, 26A, 28A are incident on the first reflector 50A at different angles, and the first reflector 50A is in a third selector position 454C which directs (selects) the third laser beam 26A at the second reflector 52A to become the output beam 12.

Figure 4D:
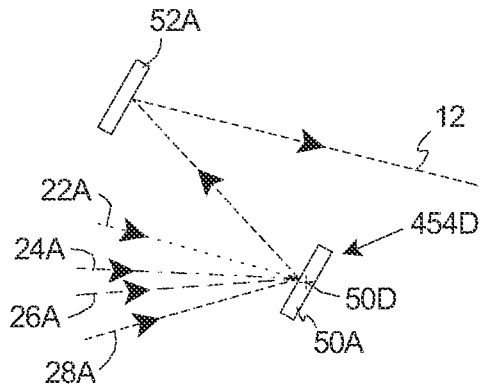

Further, FIG. 4D is a simplified top illustration of the first reflector 50A, the second reflector 52A, the first laser beam 22A (dotted line), the second laser beam 24A (dot-dashed line), the third laser beam 26A (long dashed line), and the fourth laser beam 28A (short dashed line). In FIG. 4D, the laser beams 22A, 24A, 26A, 28A are incident on the first reflector 50A at different angles, and the first reflector 50A is in a fourth selector position 454D which directs (selects) the fourth laser beam 28A at the second reflector 52A to become the output beam 12.

With this design, the movement of the first reflector 50A about the first rotational axis 50D (a single axis movement) is used to select the beam 22A, 24A, 26A, 28A that forms the laser beam 12. The selector positions 454A-454D that individually select each laser beam 22A, 24A, 26A, 28A can be indexed and saved in the controller 20 (illustrated in FIG. 1).

In FIGS. 4A-4D, all of the beams 22A, 24A, 26A, 28A are illustrated as being directed at the beam steering assembly 18 at once. This occurs when sufficient power is directed to all of the laser modules (not shown in FIGS. 4A-4B) at the same time. Typically, however, sufficient power will be directed to only one laser module (not shown in FIGS. 4A-4B) at any given time. With this example, only one of the beams 22A, 24A, 26A, 28A will be directed at the beam steering assembly 18 at any given time.

Importantly, as provided above, the beam steerers 50, 52 additionally can be controlled to actively steer the output beam 12 as a function of wavelength. In FIG. 1, the first beam steerer 50 is controlled to steer the respective beam 22A, 24A, 26A, 28A in the horizontal plane, and the second beam steerer 53 is controlled to steer the respective beam 22A, 24A, 26A, 28A in the vertical plane. Stated in another fashion, the first reflector 50A is rotated about the first rotational axis 50D and the second reflector 50B is rotated about the second rotational axis 52D to precisely steer the output beam 12 along the desired beam path 12A during tuning. In FIG. 1, the first rotational axis 50D is orthogonal to the second rotational axis 52D. With this design, rotation of two reflectors 50A, 52A about separate axes 50D, 52D results in the ability to adjust the beam path 12A.

It should be noted that (i) the first reflector 50A can be moved within a small, first range of rotational positions (including the first selector position 454A) and still direct the first laser beam 22A at the second reflector 52A to become the output beam 12; (ii) the first reflector 50A can be moved within a small, second range of rotational positions (including the second selector position 454B) and still direct the second laser beam 24A at the second reflector 52A to become the output beam 12; (iii) the first reflector 50A can be moved within a small, third range of rotational positions (including the third selector position 454C) and still direct the third laser beam 26A at the second reflector 52A to become the output beam 12; and (iv) the first reflector 50A can be moved within a small, fourth range of rotational positions (including the fourth selector position 454D) and still direct the fourth laser beam 22D at the second reflector 52A to become the output beam 12.

As a result thereof, (i) the first reflector 50A can be moved within the first range of rotational positions to actively steer the first laser beam 22A during tuning of the first laser module 22; (ii) the first reflector 50A can be moved within the second range of rotational positions to actively steer the second laser beam 24A during tuning of the second laser module 24; (iii) the first reflector 50A can be moved within the third range of rotational positions to actively steer the third laser beam 26A during tuning of the third laser module 26; and (iv) the first reflector 50A can be moved within the fourth range of rotational positions to actively steer the fourth laser beam 28A during tuning of the fourth laser module 28.

Similarly, the second reflector 52A can be moved within a small, span of rotational positions to actively steer the respective laser beam 22A, 24A, 26A, 28A that is incident on the second reflector 52A during tuning of the respective laser module 22, 24, 26, 28.

Figure 5A:
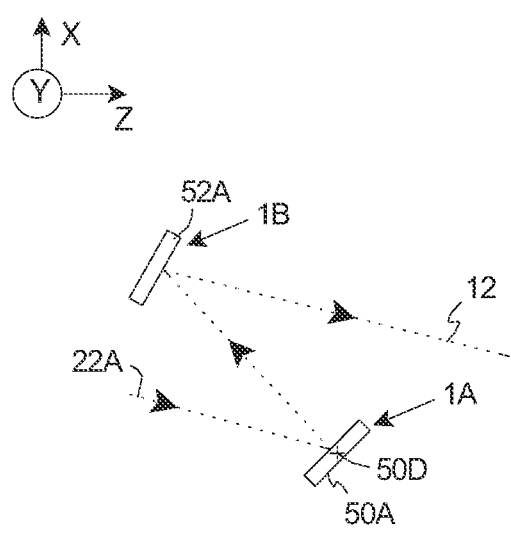
FIGS. 5A and 5B are alternative, simplified top illustrations the first reflector, the second reflector, and a first laser beams.
Figure 5B:
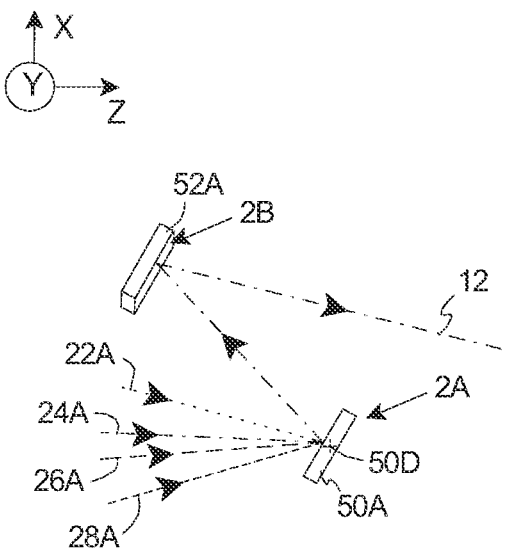

FIGS. 5A and 5B are alternative, simplified top illustrations of the first reflector 50A, the second reflector 52A, and the first laser beam 22A (dotted line). In FIGS. 5A and 5B, the first reflector 50A is positioned within the first range of rotational positions, and the second reflector 52A is positioned within the span of rotational positions so that the first beam 22A becomes the steered laser beam 12. More specifically, in FIG. 5A, the first reflector 50A is at rotational position 1A, and the second reflector 52A is at rotational position 1B. Further, in FIG. 5B, the first reflector 50A is at rotational position 2A which is different from rotational position 1A, and the second reflector 52A is at rotational position 2B which is different from rotational position 1B.

It should be noted that the other beams 24A, 26A, 28A can be actively steered in a similar fashion. Thus, the reflectors 50A, 52A can be individually rotated as necessary as a function of wavelength to provide active pointing compensation for the output beam 12.

Referring back to FIG. 1, the controller 20 controls at least a portion of the operation of the assembly 10. In certain embodiments, the controller 20 can control the wavelength and steering of the laser beam 12 by individually controlling (i) the current that is directed to each laser module 22, 24, 26, 28; (ii) the position of each grating 46A; and (iii) the position of each reflector 50A, 52A. The controller 20 can include one or more processors 20A and one or more electronic storage devices 20B. In FIG. 1, the controller 20 is illustrated as a centralized unit. Alternatively, the controller 20 can be a distributed controller.

In certain embodiments, the controller 20 is designed to support high speed buses. Further, in certain embodiments, the controller 20 can be controlled with a laptop or smart phone that is connected with a USB or wireless link.

The controller 20 can direct current to each laser module 22, 24, 26, 28 in a pulsed fashion or a continuous fashion.

In certain embodiments, the controller 20 sequentially directs power to each laser modules 22, 24, 26, 28 so that only one laser module 22, 24, 26, 28 is firing at one time. In an alternative embodiment, the controller 20 can simultaneously direct power to the laser modules 22, 24, 26, 28 to fire all the laser module 22, 24, 26, 28 at the same time. In this embodiment, the beam steering assembly 18 can quickly select the output laser beam 12 from the various laser beams 22A, 24A, 26A, 28A to quickly select four alternative wavelength ranges for the output laser beam 12.

It should be noted that when the laser modules 22, 24, 26, 28 are sequentially operated, less power is consumed, and less heat is generated than if all of the modules 22, 24, 26, 28 are powered at once. This simplifies the thermal management of the system.

Further, the controller 20 can direct power slightly below what is required to lase the on-deck (next activated) laser module 22, 24, 26, 28 just prior to it being used for the laser beam 12 to allow for quick transitions (switch times) between laser modules 16, 18, 20, 22. This reduces the time required to achieve beam stability when transitioning between laser modules 16, 18, 20, 22. In this embodiment, the controller 20 directs (i) power to the laser modules 22, 24, 26, 28 so that only one of the laser modules 22, 24, 26, 28 is firing at one time, and (ii) power to the beam steering assembly 18 so that the beam steering assembly 18 directs that firing beam along the beam path 12A, while providing directional compensation for the laser beam 12 as the laser assembly 16 is tuned.

In one embodiment, the laser assembly 16 is tuned, and one or more pulses can be generated having approximately the same first center wavelength ("first target wavelength"). Subsequently, the laser assembly 16 can be tuned, and one or more pulses can be generated having approximately the same second center wavelength ("second target wavelength") that is different from the first center wavelength. Next, the laser assembly 16 can be tuned, and one or more pulses can be generated having approximately the same third center wavelength ("third target wavelength") that is different from the first and second target wavelengths. This process can be repeated to a plurality of additional target wavelengths throughout a portion or the entire tunable range. As non-exclusive examples, the number of pulses at each discrete target wavelength can be 1, 5, 10, 50, 100, 200, 500, 1000, 10000 or more.

Further, the number of discrete target wavelengths in the tunable range can be varied according to the application. As non-exclusive examples, the number of discrete target wavelengths utilized can be approximately 1, 2, 3, 4, 5, 6, 7, 8, 9, 10, 15, 20, 25, 40, 200, 226, 400, 552 or 4000 within the tunable range.

In one embodiment, each laser modules 22, 24, 26, 28 can be individually calibrated using a wavelength measurement device (not shown) during manufacturing to determine the correlation between the feedback signals and the wavelength of the respective laser beam 22A, 24A, 26A, 28A. With this design, each position feedback signal of each laser modules 22, 24, 26, 28 can be corresponded to a measured center wavelength of the laser beam 22A, 24A, 26A, 28A. Thus, each module 22, 24, 26, 28 can be calibrated at the module level prior to installation into the system.

Additionally, or alternatively, after the modules 22, 24, 26, 28 are added to the assembly 10, the entire assembly 10 can be wavelength calibrated using a wavelength measurement device (not shown). In this embodiment, with the assembly 10 activated, each laser module 22, 24, 26, 28 can be sequentially operated while monitoring position of the respective grating 46A, and the wavelength of the output pulses of the laser beam 12 with the measurement device. With this design, the assembly 10 can be wavelength calibrated, and the controller 20 can determine a center wavelength of the output pulses of the laser beam 12 based on the position signal of the respective gratings 46A of the laser modules 22, 24, 26, 28.

The collection of accurate spectra requires that the wavelength of the laser beam 12 be precisely known as the assembly 10 is tuned. In certain embodiments, the controller 20 directs pulses of power to the respective gain medium 40 based on the feedback signal received from the respective feedback detector 46C. In this example, the controller 20 can direct a pulse of power to the gain medium 40 every time the optical reader 46C reads a predetermined number of encoder marks. For example, the predetermined number can be one, two, or three encoder marks.

With this design, the controller 20 can, in sequential fashion, (i) selectively direct pulses of power to the gain medium 40 of the first laser module 22 based on a first feedback signal, (ii) selectively direct pulses of power to the gain medium 40 of the second laser module 24 based on a second feedback signal, (iii) selectively direct pulses of power to the gain medium 40 of the third laser module 26 based on a third feedback signal, and (iv) selectively direct pulses of power to the gain medium 40 of the fourth laser module 28 based on a fourth feedback signal.

With this design, each laser module 22, 24, 26, 28 can be controlled to generate a set of sequential, specific, different wavelength pulses that span a portion of the desired wavelength range. In one non-exclusive example, each laser module 22, 24, 26, 28 can be controlled to sequentially generate approximately one thousand different wavelength output pulses that cover a detection range of approximately two micrometers in the mid-infrared range. However, the number of different pulses and the range can be different than this example.

The duration of each pulse of power directed by the controller 20 to the gain medium 40 can also be varied. In alternative, non-exclusive embodiments, controller 20 can control each pulse of power to have a duration of approximately 10, 25, 50, 75, 100, 150, 200, 300, 400, 500, 600 or 700 nanoseconds.

Additionally, the assembly 10 can be steering calibrated using a steering measurement device (e.g. a camera, not shown) during manufacturing of the assembly 10. More specifically, with the assembly 10 activated, each laser module 22, 24, 26, 28 can be sequentially operated while monitoring the beam path 12A of the laser beam 12 as the wavelength is changed. For each targeted wavelength, the reflectors 50A, 52A can be rotated as necessary to achieve the desired beam path 12A. With this design, the rotational position of each reflector 50A, 52A (measured by the position sensors 50C, 52C) necessary to achieve the desired beam path 12A can be wavelength calibrated, and the controller 20 can position each reflector 50A, 52A as necessary to achieve the desired beam path 12A as the wavelength is tuned.

Stated in another fashion, the assembly 10 can be steering calibrated by determining for each target wavelength the corresponding rotational positions of each reflector 50A, 52A necessary to achieve the desired beam path 12A. Each separate wavelength will have a corresponding first reflector 50A position and a corresponding second reflector 52A position that compensates for beam drift. This information can be put into a lookup table along with the grating 46A position information required to generate each target wavelength. Subsequently, the controller 20 can use this information from the lookup table to generate an accurately tuned laser beam 12 with active pointing compensation that compensates for beam drifting to reduce targeting error as the laser beam 12 is tuned.

In one embodiment, during the operation of each laser module 22, 24, 26, 28, the pulsing of the power to the respective gain medium 40, and the rotational position of each beam steerer 50, 52 can be tied directly to the angular position of the respective grating 46A using a phase-locked-loop (PLL) technique where the position feedback signals from the feedback detector 46C are up-converted in frequency and phase locked to the angular signals to allow the pulses of power to be fired at precise angular increments, with the beam steerers 50, 52 correctly positioned to actively steer the laser beam 12.

It should be noted that the steering calibration can be performed at different temperatures to generate a separate look-up table for different temperature ranges. With this design, the controller 20 can use the appropriate look-up table that corresponds to the current temperature to provide improved beam steering compensation for each temperature range. As a result thereof, the laser beam 12 can be accurately steered as a function of wavelength.

It should be noted that the assembly 10 can be designed to include more or fewer components than described above. For example, as illustrated in FIG. 1, the assembly 10 can include one or more spatial filters 56 that suppress/block stray light. In this embodiment, the spatial filter 56 is positioned along the path of the output beam 12 between the second reflector 52A and the window 14C. For example, the spatial filter 56 can include a block having a transmission aperture 56A (e.g. a pinhole or slit) centered on the path of the output beam 12. With this design, the spatial filter 56 will block any light that deviates too far off of the path of the laser beam 12.

Figure 6A:
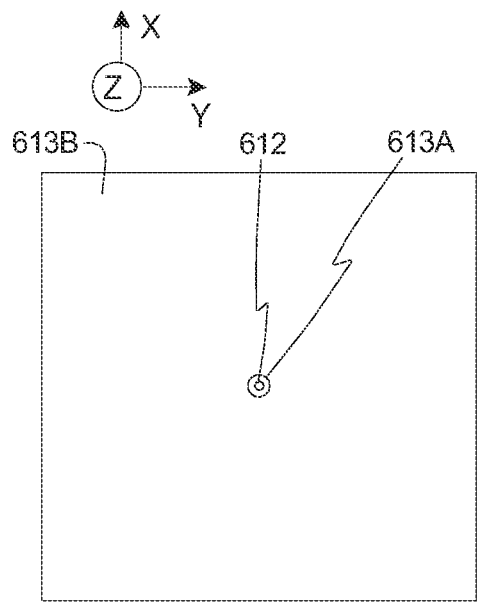
FIG. 6A is a simplified schematic of an object, target area, and a laser beam incident on the object when the laser beam is steered along a desired beam path that is constant over time.

FIG. 6A is a simplified schematic of a target area 613A on an object 613B, and a laser beam 612 directed at the target area 613A with the assembly 10 (illustrated in FIG. 1). In this schematic, the object 613B is illustrated as a box, the target area 613A is illustrated as a circle, and the incident laser beam 612 is also illustrated as a small circle. In this embodiment, the assembly 10 is controlled so that the laser beam 612 is always incident on the target area 613A as the wavelength is tuned. Thus, even as the wavelength of the laser beam 612 is tuned, the beam steering assembly 18 (illustrated in FIG. 1) will adjust reflector 50A, 52A (illustrated in FIG. 1) position as a function of wavelength to maintain the laser beam 612 incident on the target area 613A. This will optimize the optical powder of the laser beam 612 on the target area 613A.

The laser beam 612 can have a beam cross-section area, and the target area 613A can have a target cross-sectional area. Typically, the present invention keeps the centroid of beam on the target of a much smaller area than the size of the beam. As alternative, non-exclusive embodiments, the beam cross-section area (diameter) can be several millimeters while maintaining a pointing of less than fifty microradians.

Figure 6B:
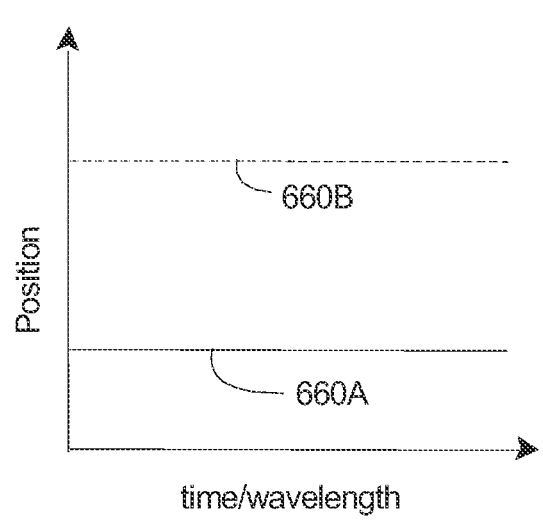
FIG. 6B is a graph that illustrates position of the laser beam on the object relative to wavelength.

FIG. 6B is a graph that plots a position of the laser beam on the object versus wavelength/time. In FIG. 6B, solid line 660A represents the X axis position of the incident laser beam on the object, and dashed line 660B represents the Y axis position of the incident laser beam on the object. In this example, the controller 20 (illustrated in FIG. 1) dynamically adjusts the beam steering assembly 18 (illustrated in FIG. 1) to maintain the X axis and Y axis position of the laser beam constant as the wavelength changes over time (laser assembly tuned). As a result thereof, the laser beam with follow the desired beam path that has a fixed desired axis.

Figure 7A:
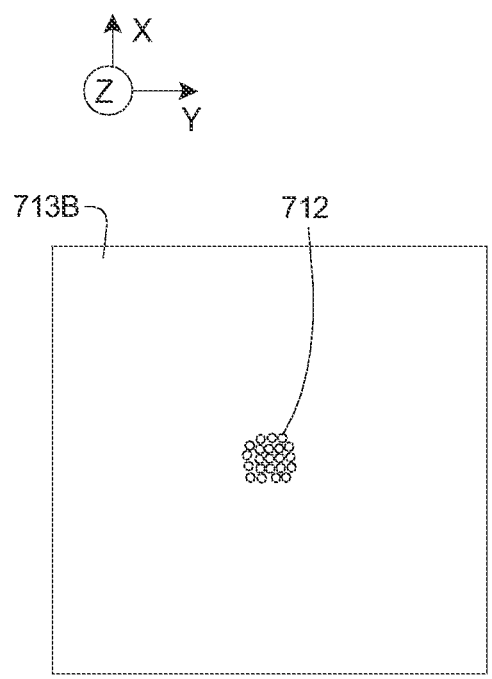
FIG. 7A is a simplified schematic of an object and a plurality of locations where the laser beam is incident on the object when the laser beam is steered along a desired beam path that is varied over time.

FIG. 7A is another simplified schematic of an object 713B, and the laser beam 712 directed at the object 713B by the assembly 10 (illustrated in FIG. 1). In this schematic, the object 713B is illustrated as a box, and the incident laser beam 712 is illustrated as a plurality of small circles to represent that the laser beam 712 is be actively moved relative to the object 713B over time. In this embodiment, the assembly 10 is controlled so that the laser beam 712 is steered in a desired pattern as the wavelength is tuned. Thus, even as the wavelength of the laser beam 712 is tuned, the beam steering assembly 18 (illustrated in FIG. 1) will adjust as a function of wavelength to maintain the laser beam 712 incident on the desired beam path. Alternatively, the beam steering assembly 18 can steer as a function of time.

Figure 7B:
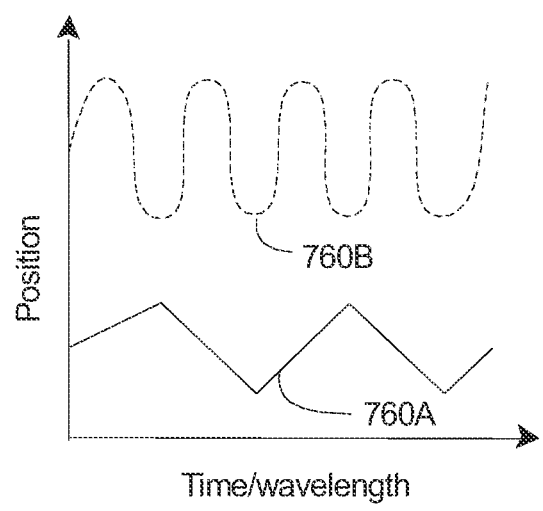
FIG. 7B is a graph that illustrates position of the laser beam on the object varies relative to wavelength.

FIG. 7B is a graph that plots a position of the laser beam on the object versus wavelength/time. In FIG. 7B, solid line 760A represents the X axis position of the incident laser beam on the object, and dashed line 760B represents the Y axis position of the incident laser beam on the object. In this example, the controller 20 (illustrated in FIG. 1) dynamically adjusts the beam steering assembly 18 (illustrated in FIG. 1) to vary the X axis and Y axis position of the laser beam on the object as the wavelength changes over time (laser assembly tuned). As a result thereof, the laser beam with follow the desired beam path that has a variable desired axis. Further, the beam steering assembly 18 can independently modulate the pointing position of the laser beam as desired.

Figure 8:
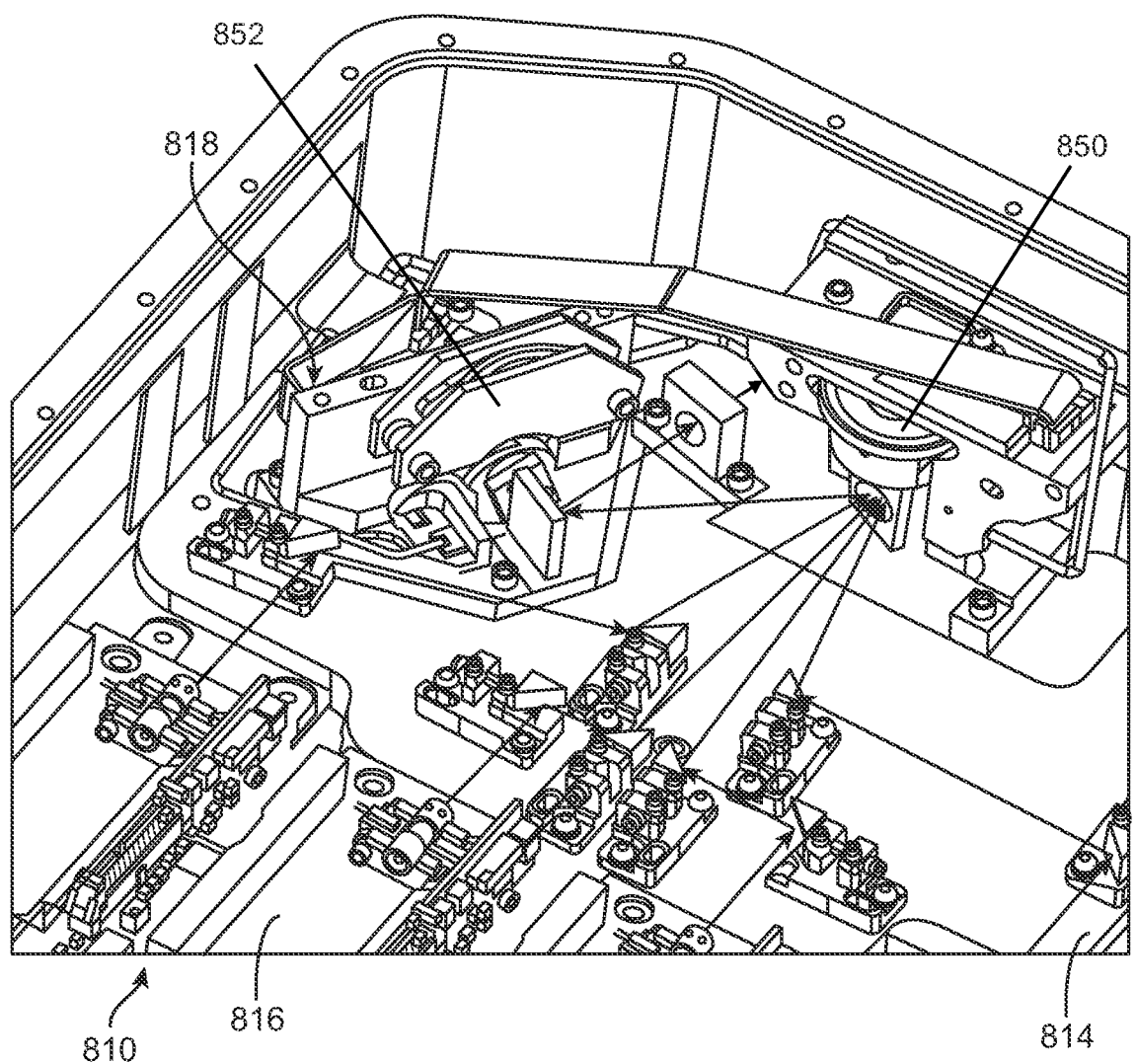
FIG. 8 is a perspective view of a portion of the assembly.

FIG. 8 is a perspective view of a portion of an assembly 810 including (i) a frame 814, (ii) a laser assembly 816 that is tunable over the tunable range, (iii) a beam steering assembly 818 including a first beam steerer 850 and the second beam steerer 852, and (iv) a controller (not shown) that dynamically controls the beam steering assembly 818. In FIG. 8, these components are similar to the corresponding components described above and illustrated in FIG. 1.

Figure 9:
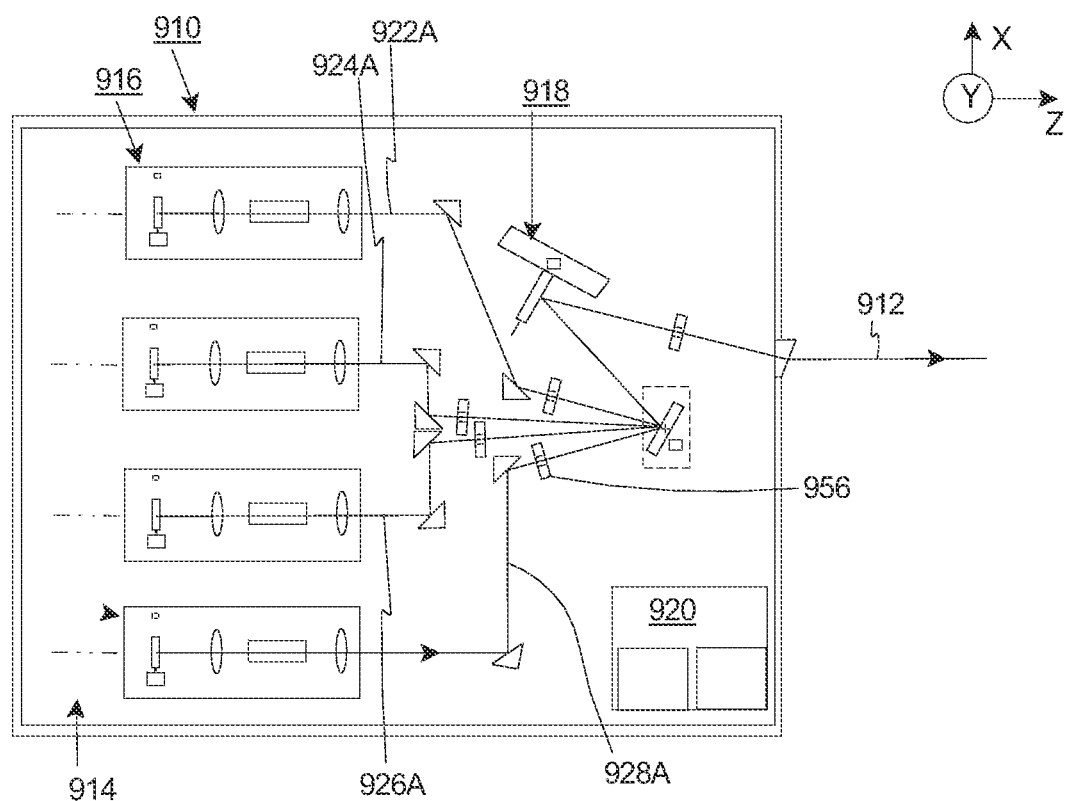
FIG. 9 is a simplified top schematic illustration of another embodiment of the assembly.

FIG. 9 is a simplified top schematic illustration of another embodiment of the assembly 910 that generates an output beam 912. In this embodiment, the assembly 910 includes (i) a frame 914, (ii) a laser assembly 916 that is tunable over the tunable range, (iii) a beam steering assembly 918, and (iv) a controller 920 that dynamically controls the beam steering assembly 918 that are similar to the corresponding components described above and illustrated in FIG. 1.

However, in FIG. 9, the assembly 910 additionally includes a separate spatial filter 956 for each laser beam 922A, 924A, 926A, 928A positioned before the beam steering assembly 918. With this design, each spatial filter 956 can block any stray light in each respective laser beam 922A, 924A, 926A, 928A. It should be noted that the assembly 910 can be designed with a spatial filter 956 for only some of the laser beams 922A, 924A, 926A, 928A. Further, the spatial filters 956 can be used in any of the designs provided herein.

Figure 10:
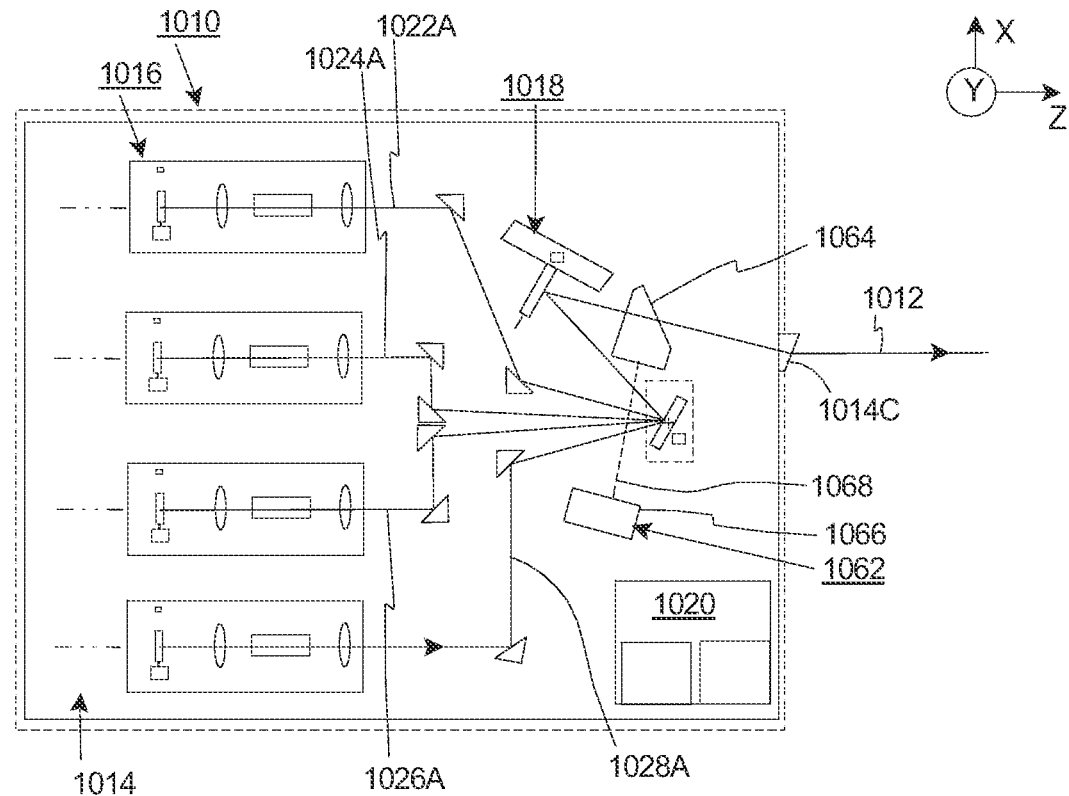
FIG. 10 is a simplified top schematic illustration of still another embodiment of the assembly.

FIG. 10 is a simplified top schematic illustration of still another embodiment of the assembly 1010 that generates an output beam 1012. In this embodiment, the assembly 1010 includes (i) a frame 1014, (ii) a laser assembly 1016 that is tunable over the tunable range, (iii) a beam steering assembly 1018, and (iv) a controller 1020 for dynamically controlling the beam steering assembly 1018 that are similar to the corresponding components described above and illustrated in FIG. 1.

However, in this embodiment, the assembly 1010 additionally includes a sensor assembly 1062 that analyzes the output beam 1012 before it exits the frame 1014. In this embodiment, the sensor assembly 1062 includes a beam pickoff 1064, and a sensor 1066. For example, the beam pickoff 1064 (i) can be positioned between the beam steering assembly 1018 and the window 1014C along the path of the output beam 1012, (ii) can pick off a test beam portion 1068 (illustrated with a dashed line) from the output beam 1012, and (iii) can direct the test beam portion 1068 at the sensor 1066. As a non-exclusive example, the beam pickoff 1064 can be a one degree pickoff.

The sensor 1066 can be used to sense one or more conditions of the laser beam 1012. For example, the sensor 1066 can measure a wavelength of the laser beam 1012. Alternatively or additionally, for example, the sensor 1066 can be used to measure the drifting of the laser beam 1012. The information from the sensor 1066 can be used by the controller 1012 to better control the laser assembly 1016 and/or the beam steering assembly 1018. For example, a quad-cell detector can be used to measure actual pointing changes of the beam and use the control system to maintain fixed pointing. In certain embodiments, the sensor 1066 can be used for closed loop control of the beam steering assembly 1018. In one embodiment, the lookup table can be used for coarse corrections of the beam steering assembly 1018, and the sensor 1066 information can be used for fine corrections of the beam steering assembly 1018.

It should that the sensor assembly 1062 could be alternatively or additionally positioned before the beam steering assembly 1018 to test one or more of the beams 1022A, 1024A, 1026A, 1028A.

Figure 11:
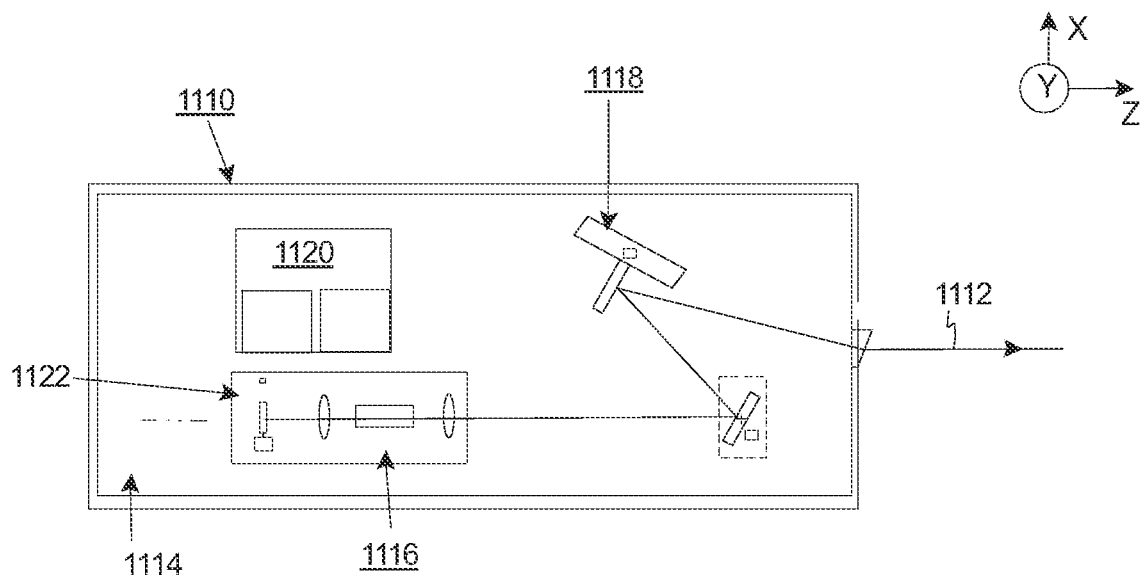
FIG. 11 is a simplified top schematic illustration of yet another embodiment of the assembly.

FIG. 11 is a simplified top schematic illustration of still another embodiment of the assembly 1110 that generates an output beam 1112. In this embodiment, the assembly 1110 includes (i) a frame 1114, (ii) a laser assembly 1116 that is tunable over the tunable range, (iii) a beam steering assembly 1118, and (iv) a controller 1120 for dynamically controlling the beam steering assembly 1018.

In this embodiment, the frame 1114, the beam steering assembly 1118, and the controller 1120 are somewhat similar to the corresponding components described above. However, in this embodiment, the laser assembly 1116 is slightly different. More specifically, in this embodiment, the laser assembly 1116 includes a single laser module 1122.

As provided herein, the assemblies 10, 810, 910, 1010, 1110 can be used in any application that requires an accurate, tunable laser beam 12, 912, 1012, 1112. A couple of non-exclusive uses for the assemblies are described below and illustrated in FIGS. 12, 13 and 14.

Figure 12:
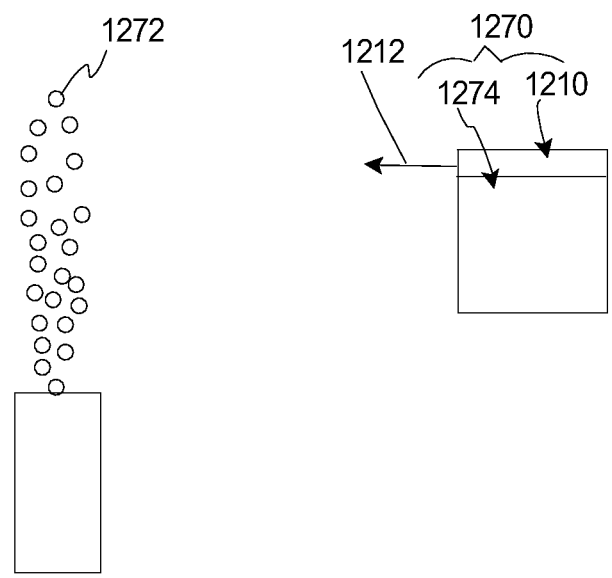
FIG. 12 is simplified illustration of a substance sensor system having features of the present invention.

FIG. 12 is simplified illustration of a substance sensor system 1270 that utilizes the assembly 1210 to analyze a substance 1272 e.g. an emitting gas. In this embodiment, the sensor system 1270 includes (i) the assembly 1210 similar to that disclosed herein that generates an laser beam 1212 that illuminates the area near the emitting gas 1272, and (ii) an imager 1274 (i.e. an infrared camera) that captures real-time, high resolution thermal images of the emitting gas 1272 that can be displayed or recorded for future viewing. As non-exclusive examples, the sensor system 1270 is useful for locating substances 1272 (i.e. leaks) in the oil, gas, utility, chemical industries, as well as locating emitting gas for homeland security. In one embodiment, the type of substance 1272 detectable by the sensor system 1270 can include any gas having molecules that absorb ("absorption features") in the MIR range.

Figure 13:
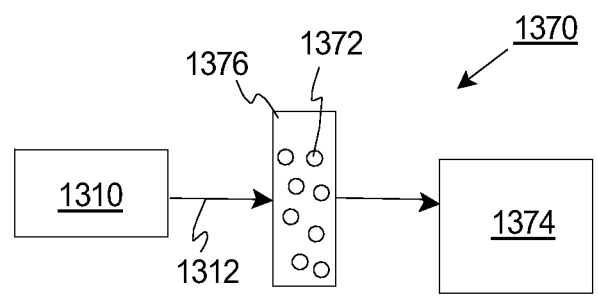
FIG. 13 is simplified illustration of another embodiment of a sensor system having features of the present invention.

FIG. 13 is simplified illustration of another embodiment of a sensor system 1370 having features of the present invention. In this embodiment, the sensor system 1370 is a spectrometer that includes (i) an assembly 1310 (similar to those described above) that generates a laser beam 1312 consisting of a plurality of output pulses, (ii) a flow cell 1376 that receives a substance 1372 (e.g. a liquid, gas or solid), and (iii) an imager 1374. In this embodiment, the laser beam 1312 is directed through the flow cell 1376, and the imager 1374 captures images of the light that is transmitted through the flow cell 1376. Alternatively, for example, the sensor system 1370 can be a reflective system.

Figure 14:
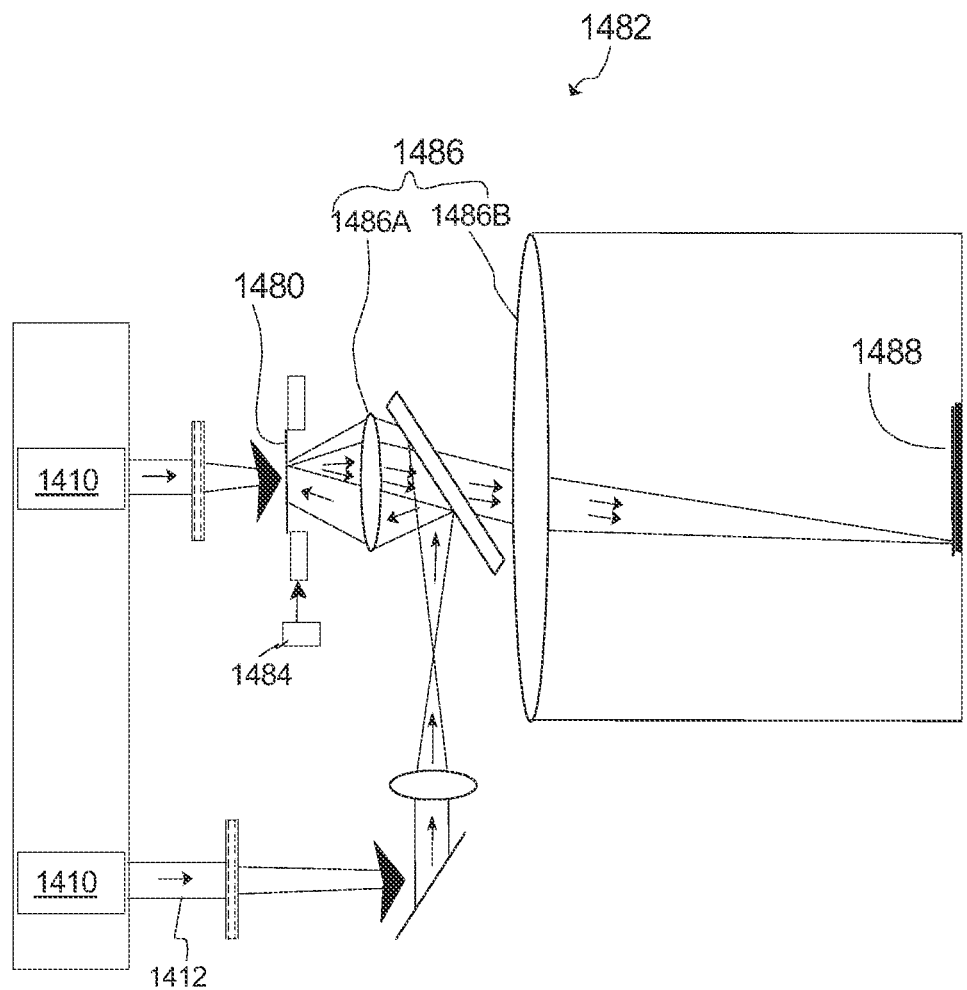
FIG. 14 is a simplified view of a microscope having features of the present invention.

FIG. 14 is a simplified schematic illustration of a sample 1480 and a non-exclusive embodiment of an imaging microscope 1482 having features of the present invention. In particular, the imaging microscope 1482 can be used to analyze and evaluate the various properties of the sample 1480. For example, in one embodiment, the imaging microscope 1482 is an infrared imaging microscope that uses tunable laser radiation to spectroscopically interrogate one or more samples 1480 in order to analyze and identify the properties of the sample.

The sample 1480 can be a variety of things, including human tissue, animal tissue, plant matter, explosive residues, powders, liquids, solids, inks, and other materials commonly analyzed using Fourier transform infrared (FTIR) microscopes. More particularly, in certain non-exclusive applications, the sample 1480 can be human tissue and the imaging microscope 1482 can be utilized for rapid screening of the tissue sample 1480 for the presence of cancerous cells and/or other health related conditions; and/or the imaging microscope 1482 can be utilized in certain forensic applications such as rapid screening of the sample 1480 for the presence of explosive residues and/or other dangerous substances.

Further, the sample 1480 can be thin enough to allow study through transmission of an illumination beam, e.g., an infrared illumination beam, through the sample 1480 (i.e. in transmission mode), or the sample 1480 can be an optically opaque sample that is analyzed through reflection of an illumination beam, e.g., an infrared illumination beam, by the sample (i.e. in reflection mode). For example, in the embodiment illustrated in FIG. 14, the imaging microscope 1482 can alternatively be utilized in both transmission mode and reflection mode.

The design of the imaging microscope 1482 can be varied. In the embodiment illustrated in FIG. 14, the imaging microscope 1482 includes (i) two of the assemblies 1410 that are similar to the assemblies described above that generate laser beams 1412; (ii) a stage assembly 1484 that retains and positions the sample 1480, (iii) an imaging lens assembly 1486 (e.g., one or more lenses 1486A, 1486B), and (iv) an image sensor 1488 that converts an optical image into an array of electronic signals. The design of each of these components can be varied pursuant to the teachings provided herein.

In one embodiment, the assemblies 1410 each emits a temporally coherent, illumination beam 1412 that is usable for illuminating and analyzing the sample 1480 in transmission mode; and/or (ii) emits a temporally coherent, illumination beam that is usable for illuminating and analyzing the sample 1480 in reflection mode.

A suitable imaging microscope 1482 is described in more detail in PCT Application No. PCT/US2012/061987, having an international filing date of Oct. 25, 2012, entitled "Infrared Imaging Microscope Using Tunable Laser Radiation". As far as permitted, the contents of PCT/US2012/061987, are incorporated herein by reference.

While the particular assemblies as shown and disclosed herein is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An assembly comprising:
a beam steering assembly including a first beam steerer and a second beam steerer;

a laser assembly including a first laser module that is tunable over a first range, the first laser module including a first gain medium that generates a first beam that is directed at the beam steering assembly when power is directed to the first laser module, the first beam having a first wavelength that varies as the first laser module is tuned; and a controller that dynamically controls the first beam steerer and the second beam steerer of the beam steering assembly as a function of wavelength to dynamically steer the first beam as the first laser module is tuned over at least a portion of the first range, the controller controlling the first beam steerer to dynamically steer the first beam in a first plane, and the controller controlling the second beam steerer to dynamically steer the first beam in a second plane that is different from the first plane.

2. The assembly of claim 1 wherein the controller dynamically controls the beam steering assembly so that the first beam is directed along a desired beam path while the first laser module is tuned over at least a portion of the first range.

3. The assembly of claim 2 wherein the desired beam path is along a desired axis.

4. The assembly of claim 2 wherein the desired beam path varies over time.

5. The assembly of claim 2 wherein the desired beam path is varied relative to wavelength.

6. The assembly of claim 1 wherein the controller dynamically controls the beam steering assembly so that the first beam is directed at a substantially constant target area while the first laser module is tuned over at least a portion of the first range.

7. The assembly of claim 6 wherein the controller dynamically controls the beam steering assembly so that the first beam is directed at the substantially constant target area while the first laser module is tuned over at least seventy percent of the first range.

8. The assembly of claim 6 wherein the controller dynamically controls the beam steering assembly so that the first beam is directed within less than fifty micrometers of the target area while the first laser module is tuned over at least a portion of the first range.

9. The assembly of claim 1 wherein the first plane is orthogonal to the second plane.

10. The assembly of claim 1 wherein at least one of the beam steerers includes a reflector that is selective moved about a rotational axis to dynamically steer the first beam as a function of wavelength of the first beam.

11. The assembly of claim 1 wherein the first beam steerer includes a first reflector that is selective moved about a first rotational axis and the second beam steerer includes a second reflector that is selectively moved about a second rotation axis to dynamically steer the first beam as the first laser module is tuned over at least a portion of the first range.

12. The assembly of claim 1 wherein the controller dynamically controls the beam steering assembly to dynamically steer the first beam so that an optical power of the first beam on a target area is optimized.

13. The assembly of claim 1 wherein the laser assembly includes a second laser module that generates a second beam that is tunable over second range and that is directed at the beam steering assembly when power is directed to the second laser module, the second beam having a second wavelength that varies as the second laser module is tuned; wherein the controller dynamically controls the first beam steerer to alternatively direct the first beam and the second beam at the second beam steerer.

14. A method comprising:
providing a beam steering assembly including a first beam steerer and a second beam steerer;
generating a first beam that is directed at the beam steering assembly with a first laser module that is tunable over a tunable first range, the first beam having a first wavelength that varies as the first laser module is tuned; and
dynamically controlling the beam steering assembly as a function of wavelength with a controller to dynamically steer the first beam as the first laser module is tuned over at least a portion of the first range;
dynamically steering the first beam in a first plane with the first beam steerer; and
dynamically steering the first beam in a second plane that is different than the first plane with the second beam steerer.

15. The method of claim 14 wherein the dynamically controlling includes controlling the beam steering assembly so that the first beam is directed along a desired beam path while the first laser module is tuned over at least a portion of the first range.

16. The method of claim 14 wherein the dynamically controlling includes controlling the beam steering assembly so that the first beam is directed at a substantially constant target area while the first laser module is tuned over at least a portion of the first range.

17. The method of claim 14 further comprising generating a second beam that is directed at the beam steering assembly with a second laser module that is tunable over a tunable second range, the second beam having a second wavelength that varies as the second laser module is tuned; wherein the dynamically controlling includes (i) controlling the first beam steerer to alternatively direct the first beam and the second beam at the second beam steerer, and (ii) controlling the second beam steerer as a function of wavelength to dynamically steer the beam directed at the second beam steerer.

18. The method of claim 14 wherein the first beam steerer includes a first reflector that is selective moved about a first rotational axis to alternatively direct the first beam and the second beam at the second beam steerer; and the second beam steerer includes a second reflector that is selectively moved about a second rotation axis to dynamically steer the beam directed at the second beam steerer.

19. The method of claim 14 wherein the dynamically controlling includes controlling the beam steering assembly to dynamically steer the first beam so that an optical power of the first beam on a target area is optimized.

20. An assembly comprising:
a beam steering assembly that includes a first beam steerer and a spaced apart second beam steerer;
a laser assembly including (i) a first laser module that is tunable over a tunable first range, the first laser module including a first gain medium that generates a first beam that is directed at the first beam steerer when power is directed to the first laser module, the first beam having a first wavelength that varies as the first laser module is tuned; and (ii) a second laser module that is tunable over a tunable second range, the second laser module including a second gain medium that generates a second beam that is directed at the first beam steerer when power is directed to the second laser module, the second beam having a second wavelength that varies as the second module is tuned, the second range being different from the first range; and a controller that dynamically controls the first beam steerer to individually direct one of the first beam and the second beam at the second beam steerer, and that dynamically controls the second beam steerer as a function of wavelength to dynamically steer the beam that is incident on the second beam steerer, the controller controlling the first beam steerer to dynamically steer the one of the first beam and the second beam in a first plane, the controller controlling the second beam steerer to dynamically steer the beam that is incident on the second beam steerer in a second plane that is different than the first plane.

21. The assembly of claim 20 wherein the first beam steerer includes a first reflector that is selective moved about a first rotational axis to individually direct one of the first beam and the second beam at the second beam steerer; and the second beam steerer includes a second reflector that is selectively moved about a second rotational axis as a function of wavelength; wherein the first rotational axis is different from the first rotational axis.

\* \* \* \* \*